(No Model.)
T. McCOSH.
REEL FOR BARBED FENCE WIRE.
No. 263,555. Patented Aug. 29, 1882.
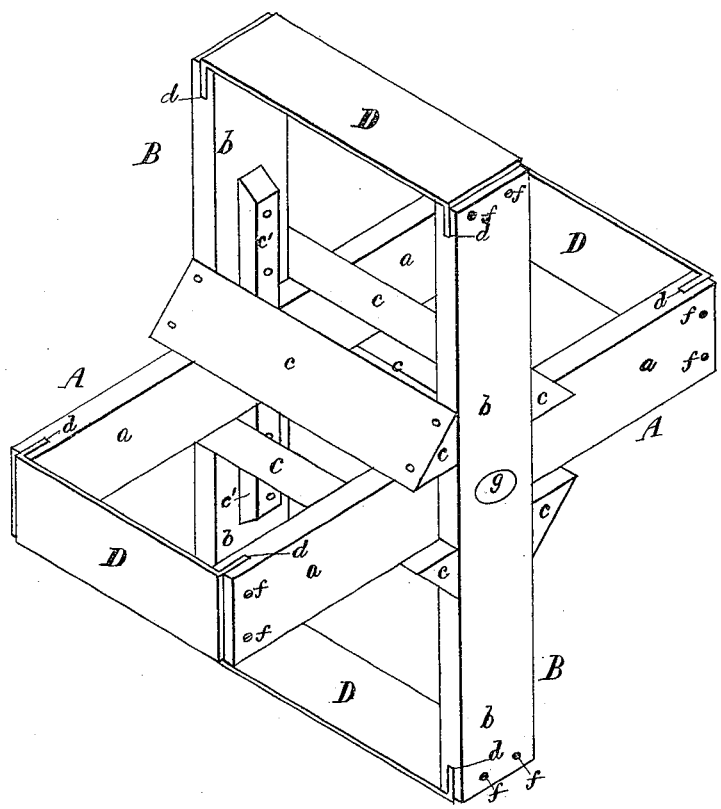
Witnesses:
B. Carlyle Fenwick.
Arthur S. Keene.
Inventor:
Thompson McCosh
by his attys
Fenwick & Lawrence

UNITED STATES PATENT OFFICE.

THOMPSON McCOSH, OF BURLINGTON, IOWA.

REEL FOR BARBED FENCE-WIRE.

SPECIFICATION forming part of Letters Patent No. 263,555, dated August 29, 1882.

Application filed July 6, 1882. (No model.)

*To all whom it may concern:*

Be it known that I, THOMPSON McCOSH, a citizen of the United States, residing at Burlington, Des Moines county, and State of Iowa, have invented a new and Improved Reel for Barbed Fence-Wire; and I do hereby declare that the following is a full, clear, and exact description thereof, reference being had to the accompanying drawing, forming a part of this my specification of said invention.

The drawing is a perspective view of my improved reel or spool as the same appears before the barbed fence-wire is wound thereon, but with the protecting metal bands in the position upon the projecting arms of the reel which they will occupy after the reel has been wound with the wire.

The object of my invention is the production of a reel or spool upon which barbed wire used in the construction of fences may be securely wound and the barbs upon the wire protected from casual damage while being often handled and transported long distances.

In the drawing, A and B are oblong rectangular frames, the two being connected together at right angles with each other, the former within the latter, as shown, and having angular cross braces, as at *c c c c*, applied to hold the frames in their relative position and strengthen the same, as represented in the figure.

To the side pieces *b* of the frame B braces, as at *c'*, are bolted, with the inner end of the braces abutting against the edges of side pieces *a* of the frame A, and serve to further strengthen and stay the frames in their normal relation to each other. The ends of the side pieces, *a a* and *b b*, are constructed with a saw-kerf, as at *d*, into which the bent ends of removable metallic cross-stays D are closely fitted and held in place, as shown, by either screws or bolts *f*. These removable cross-stays are of a width corresponding to the width of the frame-pieces *a a* and *b b*, and when in place, as shown, after the wire has been wound upon the reel, serve to protect the inclosed roll of wire against damage to the exposed barbs thereon while the reel is being rolled over in handling, said stays D receiving the blows consequent upon and during such act, and, being made of metal—either iron, steel, copper, or other suitable metal—are not liable to become either broken or so worn in the handling of the reel as to render the reel practically useless for the protection of the wire under the rough usage in transportation which this class of goods receives.

At *g* a circular aperture is made through the frames A and B to receive a shaft upon which the reel is rotated while winding the wire thereon, but previous to which act the cross-stays D are removed by withdrawal of the bolts or screws *f* and again replaced after the reel has been sufficiently wound with the fence-wire. The cross-stays D, having their ends protected within the kerfs *d*, it will be seen, are not liable to become displaced by reason of violent contact of objects against such ends during the transportation of the reel.

What I claim as my invention, and desire to secure by Letters Patent, is—

1. As a new article of manufacture, a reel or spool for the transportation of barbed fence-wire, having outer metal cross-stays, D, kerfed into the ends of the frames A and B, substantially as and for the purpose described.

2. The frames A and B, provided with metal cross-stays D, in combination with braces *c* and *c'*, substantially as and for the purpose described.

THOMPSON McCOSH.

Witnesses:
ALBERT COTSWORTH,
J. E. RHEIN.